(12) United States Patent
Kaneko

(10) Patent No.: US 7,215,849 B2
(45) Date of Patent: May 8, 2007

(54) CONNECTION STRUCTURE BETWEEN OPTICAL FIBERS ON A SUBSTRATE AND CONNECTION METHOD FOR COUPLING THE SAME

(75) Inventor: Tsuyoshi Kaneko, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 10/814,136

(22) Filed: Apr. 1, 2004

(65) Prior Publication Data
US 2004/0228581 A1 Nov. 18, 2004

(30) Foreign Application Priority Data
Apr. 25, 2003 (JP) .............................. 2003-121547

(51) Int. Cl.
*G02B 6/32* (2006.01)
*G02B 6/34* (2006.01)
(52) U.S. Cl. .......................................... 385/35; 385/36
(58) Field of Classification Search ................. 385/35
See application file for complete search history.

(56) References Cited

U.S. PATENT DOCUMENTS 6,034,405 A * 3/2000 Brady et al. ................ 257/432
6,307,996 B1 * 10/2001 Nashimoto et al. ......... 385/130
6,532,317 B2 * 3/2003 Hanneman, Jr. ............. 385/14
6,587,618 B2 * 7/2003 Raguin et al. ................ 385/33
6,868,196 B2 * 3/2005 Hanneman, Jr. ............. 385/14
2001/0046342 A1 * 11/2001 Hanneman, Jr. ............. 385/14

FOREIGN PATENT DOCUMENTS

| JP | A 6-123821 | 5/1994 |
| JP | A 7-84142 | 3/1995 |
| JP | 2004-117660 | 4/2004 |
| JP | 2004-118003 | 4/2004 |

* cited by examiner

*Primary Examiner*—David Nelms
*Assistant Examiner*—Timothy L. Rude
(74) *Attorney, Agent, or Firm*—Oliff & Berridge, PLC

(57) ABSTRACT

To provide a connection structure between optical fibers and a connection method to couple optical fibers that make it possible to secure optical transmission, a connection structure between optical fibers includes a plurality of optical fibers, a base member provided over a substrate, and a connecting part provided on a top surface of the base member and joined to each of end surfaces of the plurality of optical fibers.

16 Claims, 11 Drawing Sheets

CONNECTION STRUCTURE BETWEEN OPTICAL FIBERS ON A SUBSTRATE AND CONNECTION METHOD FOR COUPLING THE SAME

BACKGROUND OF THE INVENTION

1. Field of Invention

The present invention relates to a connection structure between optical fibers and a connection method to couple optical fibers.

2. Description of Related Art

Recently there exist tendencies of high-speed and large-volume data transmission in the information and communication technology sector so that development of optical communication technologies is in progress. In optical communication, secure optical transmission between optical fibers is required.

As a method of connecting optical fibers used for optical communication, there are, for example, a method of coupling optical fibers through an optical member, such as a lens, a method of connecting them through a connector (see Japanese Unexamined Patent Application Publication No. 6-123821), and a method of fusion-bonding them (see Japanese Unexamined Patent Application Publication No. 7-84142).

The method of connecting optical fibers through a connector is a method where a connector is provided to a tip of an optical fiber so as to connect optical fibers through the connector. The method of fusion-bonding optical fibers is a method where optical fibers are coupled to each other by joining tips of two optical fibers and applying energy to the joined part so as to fusion-bond it.

Furthermore, as a method of connecting a plurality of optical fibers to each other, there is a method where an optical fiber coupler is used. The optical fiber coupler is formed by fusion-bonding a plurality of optical fibers disposed side by side in a row, and thereafter extending the fusion-bonded part. Specifically, a fusion-bonding process is required in the case of forming an optical fiber coupler, too.

SUMMARY OF THE INVENTION

In the method of coupling optical fibers through an optical member such as a lens, it is difficult to precisely align the optical fibers with the optical member.

In the method of connecting optical fibers through a connector, the joined part of the optical fibers becomes large because a connector is provided to a tip of the optical fiber. It therefore is difficult to incorporate optical fibers connected to each other through a connector into a micro device, such as an optical module in some cases.

In addition, in the method of fusion-bonding optical fibers, considerable thermal energy should be applied to the joined part of the optical fibers. Massive manufacturing processes are usually needed to fuse the joined part of the optical fibers, increasing production cost. Moreover, in the method of fusion-bonding optical fibers, the optical fibers need to be precisely aligned with each other before fusion-bonding. In this case, aligning optical fibers with each other precisely is difficult since a diameter of an optical fiber is generally minute in size. The case of forming an optical fiber coupler also involves the same problem since a fusion-bonding process is required.

The present invention provides a connection structure between optical fibers that makes it possible to secure optical transmission between the optical fibers The invention also provides a connection method to couple optical fibers that can be easily and inexpensively implemented.

(1) A connection structure between optical fibers of a first aspect of the present invention includes a plurality of optical fibers, a base member provided over a substrate, and a connecting part provided on a top surface of the base member and joined to each end surface of the plurality of optical fibers.

Here, "base member" refers to a member having a top surface where the connecting part can be provided, and "top surface of a base member" refers to a surface where the connecting part is provided. The top surface of the base member may be a flat surface or may be a curved surface as long as the connecting part can be provided thereon.

There is no specific restriction on the shape of each end surface of the plurality of optical fibers as long as the connecting part can be provided thereon. The end surface may be circular or oval in shape. Likewise, there is no specific restriction on the sectional shape of the connecting part.

The connection structure of an aspect of the present invention having such a structure as described above can certainly transmit light between the plurality of optical fibers.

Also in an aspect of the invention, there is no specific restriction on the material of the optical fiber. For example, the present invention can be applied to any optical fiber of quartz glass, plastic, a complex material of plastic and quartz, and multicomponent glass.

(2) In the connection structure between optical fibers, the plurality of optical fibers may be provided over the substrate. Thus, the plurality of optical fibers can stably be joined to the connecting part over the substrate.

(3) In the connection structure between optical fibers, the top surface of the base member may make an acute angle with a surface that intersects the top surface at a side part of the base member. With this structure, in a case where the connecting part is formed by ejecting a droplet so as to form the connecting part precursor and hardening it thereafter, it can reduce or prevent a side surface of the base member from getting wet with the droplet. As a result, the connecting part of the required shape and size can be formed.

(4) In the connection structure between optical fibers, an upper part of the base member may be formed in a reverse-taper manner. Here, "upper part of the base member" refers to an area neighboring the top surface of the base member. With this structure, in the case where the connecting part is formed by ejecting a droplet so as to form the connecting part precursor and hardening it thereafter, an angle formed by the top surface and the side surface of the base member can be reduced while keeping the stability of the base member. This reduces or prevents the side surface of the base member from getting wet with the droplet. As a result, the connecting part of the required shape and size can be formed.

(5) In the connection structure between optical fibers, the base member may be formed monolithically with the substrate.

(6) In the connection structure between optical fibers, only an end surface of a core may be joined to the connecting part in at least one of the plurality of optical fibers.

In this case, in the at least one of the plurality of optical fibers, where only the end surface of the core is joined to the connecting part, a height of the end surface of the core may be different from a height of an end surface of a clad at an end part that is closer to the connecting part, of two end parts.

Furthermore, the core may be not covered by the clad at the end part in this case. Thus, the core and the clad form a convex portion at the end part.

(7) In the connection structure between optical fibers, a refractive index of the connecting part may be larger than a refractive index of the clad of the plurality of optical fibers.

(8) In the connection structure between optical fibers, the refractive index of the connecting part may be almost equal to a refractive index of the core of the plurality of optical fibers. With this structure, light reflection at a boundary between the connecting part and the core can be reduced so that optical loss at the boundary can be reduced.

(9) In the connection structure between optical fibers, the surround of the connecting part may be covered by sealant at the end part. With this structure, the connecting part can surely be fixed onto the end surface of the plurality of optical fibers. As a result, it becomes possible to achieve the connection structure with a higher yield.

In this case, a refractive index of the sealant may be smaller than the refractive indexes of the core of the plurality of optical fibers, and the connecting part.

In addition, the refractive index of the connecting part may be almost equal to the refractive index of the core of the plurality of optical fibers. The refractive index of the sealant may be almost equal to the refractive index of the clad of the plurality of optical fibers. With this structure, the connecting part and the sealant can be provided with the same functions as those of the core and the clad of the optical fiber, respectively. Thus, optical loss can be reduced.

(10) In the connection structure between optical fibers, the connecting part may be formed by hardening a liquid material that is hardened by applying energy.

In this case, the connecting part may be formed of ultraviolet curing resin.

(11) A connection method to couple optical fibers of a second aspect of the present invention includes the steps of (a) forming a base member over a substrate, (b) ejecting a droplet to a top surface of the base member to form a connecting part precursor, and (c) forming a connecting part by hardening the connecting part precursor while each end surface of a plurality of optical fibers is brought into contact with the connecting part precursor.

The connection method to couple optical fibers of an aspect of the present invention achieves high productivity. Moreover, a precise alignment between each of the optical fibers is not required any more. In addition, a simplified method is available to join the plurality of optical fibers to each other through the connecting part.

(12) The connection method to couple optical fibers may further include (d) providing the plurality of optical fibers over the substrate.

(13) In the connection method to couple optical fibers, the connecting part precursor may make contact with only an end surface of a core, in (c).

In this case, in the plurality of optical fibers that makes contact with the connecting part precursor, a height of the end surface of the core may be different from a height of an end surface of a clad, in (c)

(14) In the connection method to couple optical fibers, the ejection of the droplet may be implemented using an ink-jet method, in (b). Here, "ink-jet method" is a method where droplets are ejected using an ink-jet head. In this case, however, droplets to be ejected are not so-called ink, which is used for printed papers, but a liquid agent including a material substance that constitutes the connecting part. In this method, the ejection volume of the droplet is precisely adjusted. It therefore becomes possible to easily place a micro connecting part precursor onto the end surface of the optical fibers.

(15) In the connection method to couple optical fibers, the hardening of the connecting part precursor may be implemented by applying energy, in (c).

(16) The connection method to couple optical fibers may further include (e) covering the surround of the connecting part with sealant.

DETAILED DESCRIPTION OF EXEMPLARY EMBODIMENTS

Exemplary embodiments of the present invention will be described below with reference to accompanying drawings.

1. Connection Structure Between Optical Fibers

Figure 1:
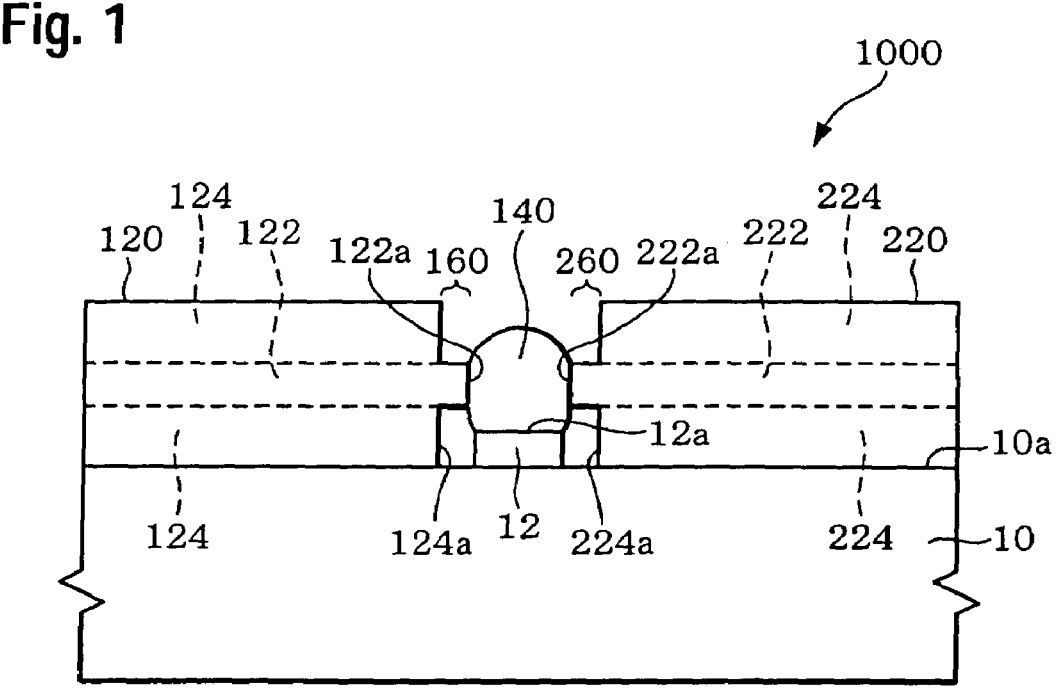
FIG. 1 is a schematic illustrating a connection structure between optical fibers of one exemplary embodiment of the present invention.
Figure 2:
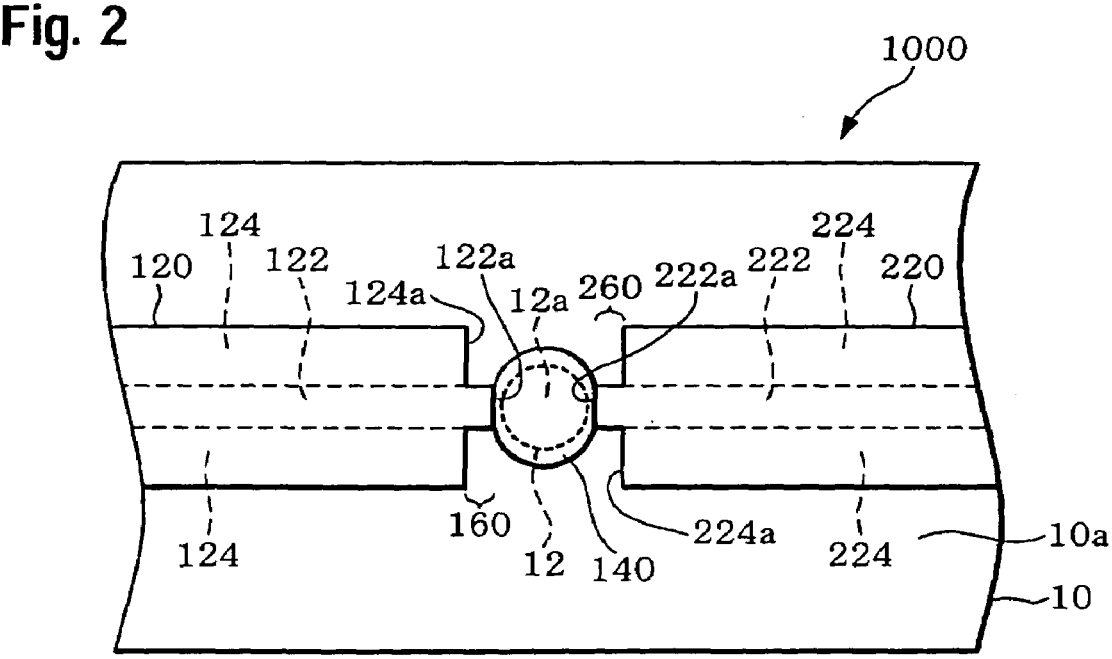
FIG. 2 is a schematic illustrating the connection structure between optical fibers shown in FIG. 1.

FIG. 1 schematically shows a side view of a connection structure between optical fibers of the present exemplary embodiment of the present invention. FIG. 2 schematically shows a plan view of the connection structure shown in FIG. 1. A connection unit 1000 is indicated in FIGS. 1 and 2 as the connection structure between optical fibers.

The connection unit 1000 includes a plurality of optical fibers (optical fibers 120 and 220), a base member 12, and a connecting part 140 as shown in FIGS. 1 and 2. The optical fibers 120 and 220 are joined to each other through the connecting part 140. Thus, the optical fibers 120 and 220 are optically coupled to each other through the connecting part 140. The connecting part 140 is provided on a top surface 12a of the base member 12. The base member 12 is provided over a substrate 10. Each component of the connection unit 1000 will now be described.

Substrate

There is no specific restriction on the material of the substrate 10. For example, semiconductor substrates, such as a silicon substrate and a compound semiconductor substrate, such as a GaAs substrate, a glass substrate, and an epoxy substrate are available.

Base Member

The base member 12 is provided over the substrate 10. The base member 12 may be formed of resin for example. In this case, the base member 12 can be formed of polyimide resin, acrylic resin, epoxy resin, or fluororesin.

The base member 12 may be formed monolithically with the substrate 10. Specifically, in this case, the base member 12 is made of the same material as that of the substrate 10. The base member 12 of such a structure can be formed by, for example, patterning the substrate 10. Although the case where the base member 12 is a cylinder shape is shown in FIGS. 1 and 2, there is no specific restriction on the shape of the base member 12 as long as it has a top surface on which the connecting part 140 can be provided.

Figure 20A:
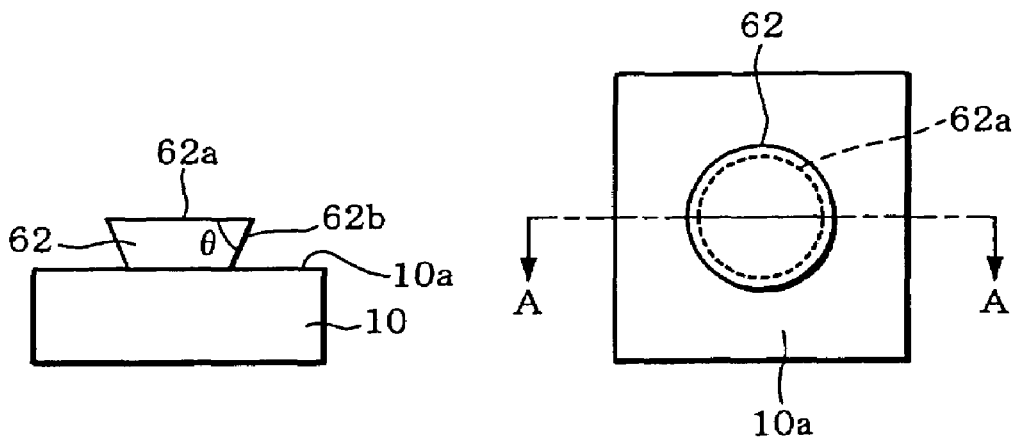
FIGS. 20a–c are schematics illustrating one modification of the base member shown in FIG. 1.
Figure 20B:
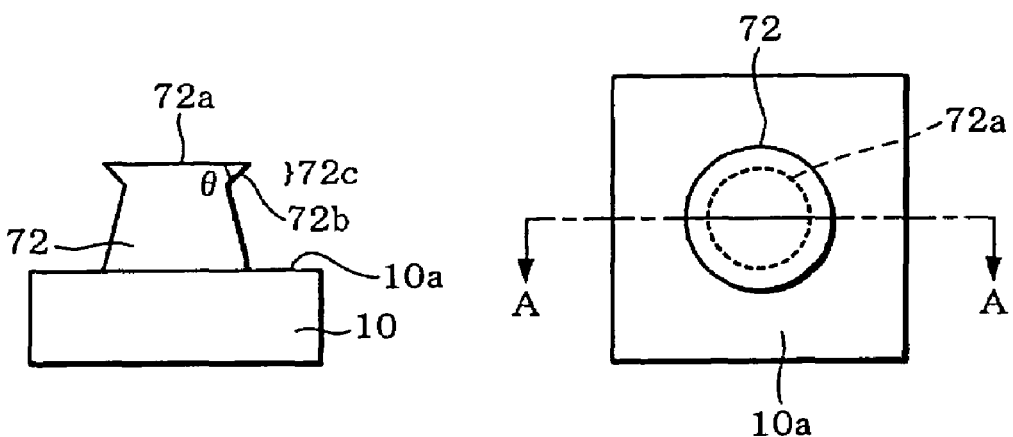
Figure 20C:
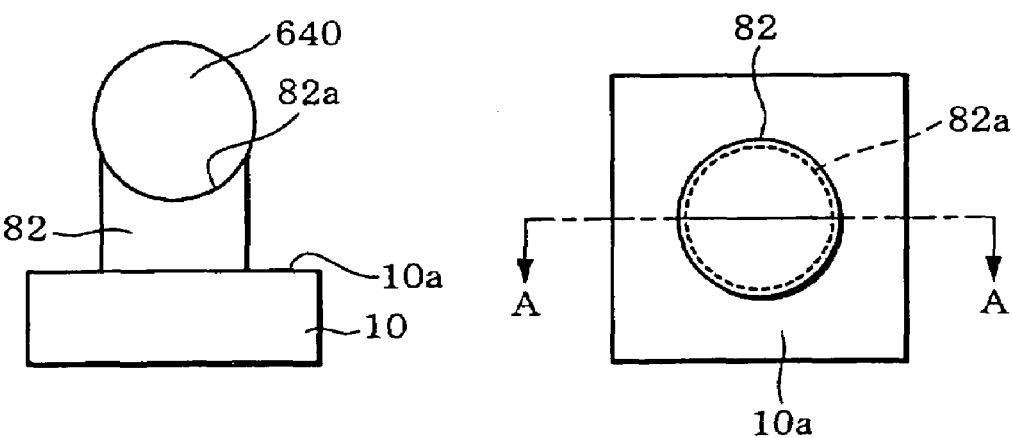

Examples of the shape of the base member are shown in FIGS. 20a–20c. In each of FIGS. 20a–20c, the right schematic shows a plan view of the vicinity of the base member, and the left schematic shows a sectional view along plane A—A line of the right schematic. On a top surface of the base member shown in FIGS. 20a–c the connecting part can be formed, and an end surface of the optical fiber is joined to the connecting part. In FIGS. 20a and b, representation of the connecting part and the optical fiber is omitted. In FIG. 20c, although representation of the optical fiber is omitted, a connecting part 640 provided on a top surface 82a of a base member 82 is illustrated.

In the base member 62 shown in FIG. 20a, an angle θ formed by a top surface 62a and a side surface 62b of a base member 62 can be an acute angle. Here, the side surface 62b of the base member 62 is a surface that intersects the top surface 62a at a side part of the base member 62. In the base member 62, a side part of the base member 62 is the side surface 62b of the base member 62.

The connecting part (not shown in the drawing) is formed by ejecting a droplet to the top surface 62a of the base member 62 to form a connecting part precursor (described later) and hardening the connecting part precursor thereafter. Therefore, since the angle θ formed by the top surface 62a and the side surface 62b of the base member 62 is an acute angle, it can be reduced or prevented the side surface 62b of the base member 62 from getting wet with the droplet, when the droplet is ejected to the top surface 62a of the base member 62. As a result, the connecting part having the required shape and size can be certainly formed.

In a base member 72 shown in FIG. 20b, an upper part 72c can be formed in a reverse-taper manner. Also in this case, the angle θ formed by a top surface 72a and a side surface 72b (a surface that intersects the top surface 72a at a side part of the base member 72) of the base member 72 is an acute angle. With this structure, the angle θ formed by the top surface 72a and the side surface 72b of the base member 72 can be further reduced while keeping the stability of the base member 72. This can certainly reduce or prevent the side surface 72b of the base member 72 from getting wet with the droplet. As a result, the connecting part having the required shape and size can be further certainly formed.

In the base member 82 shown in FIG. 20c, the top surface 82a can be a curved surface. This enables the connecting part 640, that is almost spherical, to be provided on the top surface 82a of the base member 82.

Optical Fiber

The optical fibers 120 and 220 are provided on a top surface 10a of the substrate 10, as shown in FIG. 1. Specifically, they are provided so that the longitudinal direction of them is parallel to the top surface 10a of the substrate 10.

The optical fibers 120 and 220 can be fixed on the substrate 10 by using an adhesive (not shown in the drawing) for example. Otherwise, the optical fibers 120 and 220 may be fixed on the substrate 10 by burying the whole of the optical fibers 120 and 220, and the connecting part 140 in sealant.

In the exemplary embodiment, the case where the optical fibers 120 and 220 are disposed on the substrate 10 being flat, as shown in FIG. 1, was described. Otherwise, trenches (not shown in the drawing) determining the positions of the optical fibers 120 and 220 may be provided on the substrate 10. Then the optical fibers 120 and 220 may be disposed on the trenches. This may also be applied to modifications to be described later, similarly. Such a substrate having trenches is disclosed in, for example, Japanese Unexamined Patent Application Publication No. 8-286082 (V-shape trench substrate 10 in FIG. 4).

The optical fiber 120 includes a core 122 and a clad 124. The clad 124 surrounds the core 122 concentrically. In the optical fiber 120, light is reflected at a boundary between the core 122 and the clad 124 so that the light is confined in the core 122 so as to be transmitted inside the core 122. Meanwhile, the clad 124 is covered and protected by a jacket (not shown in the drawing).

The optical fiber 220 includes a core 222 and a clad 224 as with the optical fiber 120. In the exemplary embodiment, the case where the optical fiber 220 has the same structure as that of the optical fiber 120 will be shown.

Although the exemplary embodiment shows the case where the optical fibers 120 and 220 have the sectional shape of a circle, there is no specific restriction on the sectional shape of the optical fibers 120 and 220. This can also be applied to any optical fibers shown in modifications to be described later. For example, the optical fibers 120 and 220 can be an optical fiber having the sectional shape of an oval, or even another optical fiber that has the sectional core shape of a circle or oval with the sectional clad shape of any other shape.

As shown in FIG. 1, a height of the end surface 122a of the core 122 is different from a height of an end surface 124a of the clad 124 at an end part of the optical fiber 120. Similarly, a height of an end surface 222a of the core 222 is different from a height of an end surface 224a of the clad 224 at an end part of the optical fiber 220.

Specifically, the exemplary embodiment shows the case where the core 122 is not covered by the clad 124 at the end part in the optical fiber 120. Specifically, the end surface 122a of the core 122 protrudes beyond the end surface 124a of the clad 124 at the end part of the optical fiber 120. Accordingly, the core 122 and the clad 124 form a convex portion 160.

Similarly, the exemplary embodiment shows the case where the core 222 is not covered by the clad 224 at the end part in the optical fiber 220. Specifically, the end surface 222a of the core 222 protrudes from the end surface 224a of the clad 224 at the end part of the optical fiber 220. Accordingly, the core 222 and the clad 224 form a convex portion 260.

The optical fibers 120 and 220 are joined to each other through the connecting part 140 as described above. This allows the position of the optical fiber 120 relative to the optical fiber 220 to be fixed by the connecting part 140. In the connection unit 1000, the end surface 122a of the core 122 of the optical fiber 120 faces the end surface 222a of the core 222 of the optical fiber 220.

In FIG. 1, one end part of each of the optical fibers 120 and 220 is illustrated. Specifically, of two end parts of each of the optical fibers 120 and 220, the end part closer to the connecting part 140 is illustrated. A height of the end surface of the core may be different from a height of the end surface of the clad at the other end part of each of the optical fibers 120 and 220. In this case, for example, at the other end part of each of the optical fibers 120 and 220, the connecting part (not shown in the drawing) may be formed on the end surface of the core, and another optical fiber (not shown in the drawing) may be joined to the optical fibers 120 and 220 through this connecting part. This notice can also be applied to any connection structure between optical fibers shown in modifications to be described later.

Connecting Part

As FIG. 1 shows, the connecting part 140 is coupled to the end surface 122a of the core 122 of the optical fiber 120, and the end surface 222a of the core 222 of the optical fiber 220. The connecting part 140 is provided on the top surface 12a of the base member 12.

When light emitted from the optical fiber 120 is let into the optical fiber 220, light emitted from the end surface 122a of the optical fiber 120 is let into the end surface 222a of the optical fiber 220 after going through the connecting part 140. When light emitted from the optical fiber 220 is let into the optical fiber 120, light emitted from the end surface 222a of the optical fiber 220 is let into the end surface 122a of the optical fiber 120 after going through the connecting part 140.

The connecting part 140 is made of energy-setting resin. Specifically, the connecting part 140 can be formed by hardening a liquid material that is hardened by applying energy, such as heat and light thereto. As the liquid material, for example, a precursor of ultraviolet curing resin or thermosetting resin can be used. In this case, the connecting part 140 made of ultraviolet curing resin or thermosetting resin is formed by applying energy to the precursor to harden it. As the ultraviolet curing resin, for example, acrylic resin and epoxy resin of an ultraviolet curing type can be listed. As the thermosetting resin, polyimide resin of a thermosetting type can be named.

A precursor of ultraviolet curing resin gets hardened by applying ultraviolet rays for a short time. Consequently, in the case where the connecting part 140 is formed by hardening a precursor of ultraviolet curing resin, manufacturing time can be reduced.

Specifically, the connecting part 140 can be formed by ejecting a droplet to the top surface 12a of the base member 12 to make a connecting part precursor (to be described later) on the top surface 12a of the base member 12, and then hardening the connecting part precursor.

The shape and size of the connecting part 140 can be controlled by adjusting the type and volume of the liquid material used for forming the connecting part 140. The shape and size of the connecting part 140 is determined according to the distance between the end surface 122a of the core 122 of the optical fiber 120 and the end surface 222a of the core 222 of the optical fiber 220. Specifically, the shape and size of the connecting part 140 is determined depending on the distance between the end surface 122a and the end surface 222a so as to join the end surface 122a and the end surface 222a through the connecting part 140. Otherwise, the distance between the end surface 122a and the end surface 222a may be determined depending on the shape and size of the connecting part 140. Specifically, in this case, the distance between the end surface 122a and the end surface 222a is arranged so as to join the end surface 122a and the end surface 222a through the connecting part 140. This may also be applied to modifications to be described later, similarly.

The refractive index of the connecting part 140 can be larger than the refractive indexes of the clads 124 and 224 of the optical fibers 120 and 220. With this structure, it becomes possible to reduce the chance of the light breaking into the clads 124 and 224 from the connecting part 140.

Furthermore, the refractive index of the connecting part 140 can be almost equal to the refractive indexes of the cores 122 and 222 of the optical fibers 120 and 220. With this structure, the light reflection at the boundary between the connecting part 140 and the cores 122 and 222 can be reduced so that the optical loss at the boundary can be reduced. This may also be applied to modifications to be described later, similarly.

2. Connection Method for Coupling Optical Fibers

A method of manufacturing the connection unit 1000 shown in FIG. 1 will now be described by referring to FIGS. 3–12. Each of FIGS. 3–12 schematically illustrates each single step of the connection method for coupling the optical fibers 120 and 220 through the connecting part 140.

Manufacturing End Surface of Core and Clad

In the present exemplary embodiment, the optical fibers 120 and 220 are processed so that the heights of the end surfaces 122a and 222a of the cores 122 and 222 of the optical fibers 120 and 220 become greater than those of the end surfaces 124a and 224a of the clads 124 and 224, as shown in FIGS. 1 and 2. Although the case of the optical fiber 120 will be described below as an example, the end surface of the optical fiber 220 can also be processed by the same method.

At first, procedures to protrude the end surface 122a of the core 122 beyond the end surface 124a of the clad 124 are explained below. Concretely to describe, the following methods (1) and (2) are cited as an example to protrude the end surface 122a of the core 122 beyond the end surface 124a of the clad 124.

(1) Wet Etching Method

Figure 3:
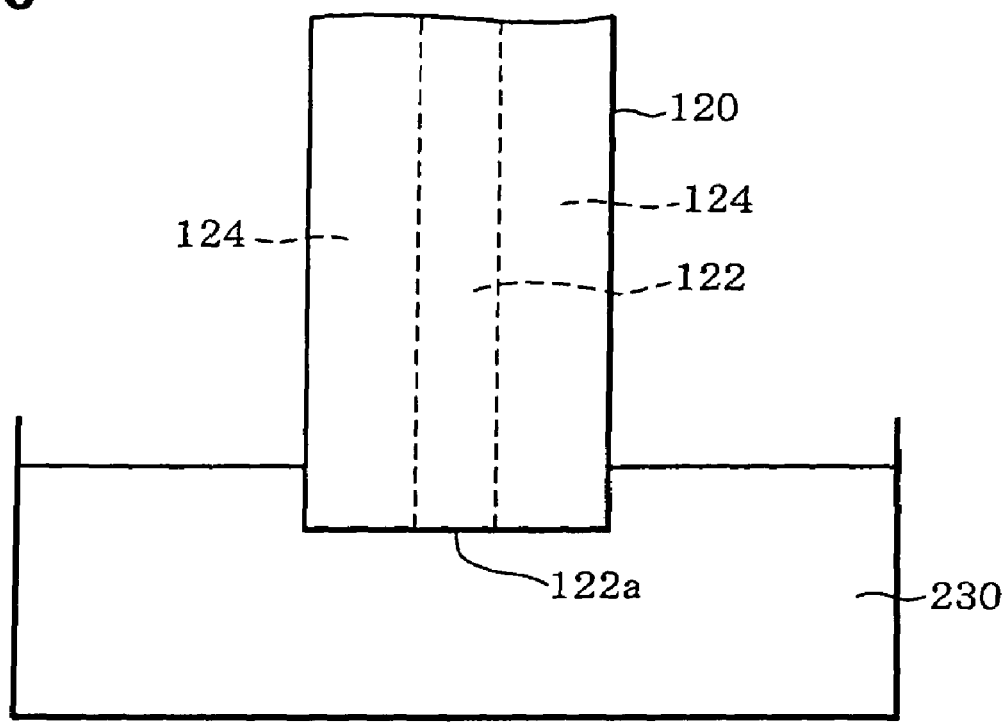
FIG. 3 is a schematic illustrating one example of methods of manufacturing the optical fibers shown in FIG. 1.

First, procedures to protrude the end surface 122a of the core 122 beyond the end surface 124a of the clad 124 by wet etching are explained (refer to FIG. 3). The following explanation is made on the premise that the optical fiber 120 is a silica-based fiber.

In general, a core and a clad of an optical fiber are composed of components different from each other in order to have a greater refractive index of the core than that of the clad. Therefore, by making use of the difference in the components of the core and clad, it is possible to selectively remove either of the core or the clad by wet etching.

An etchant which selectively removes a part of the clad 124 by implementing wet etching for the optical fiber 120 having its flat end surface (Refer to FIG. 3) is used in this case. This process enables the end surface 122a of the core 122 to get protruded beyond the end surface 124a of the clad 124.

As an etchant to be used for such a selectively etching for the core and clad of a silica-based fiber, for example, a solution prepared by blending hydrofluoric acid and ammonium fluoride (buffer fluoric acid solution) can be used. In this case, by adjusting concentrations of hydrofluoric acid and ammonium fluoride in the buffer fluoric acid solution, the clad 124 can selectively be removed.

FIG. 3 schematically illustrates the wet etching operation. As shown in FIG. 3, an end surface of the optical fiber 120 is soaked into an etchant 230. By this operation, the clad 124 is selectively dissolved in the etchant 230 to get removed selectively at the end part of the optical fiber 120.

Specifically, the clad 124 can selectively be removed by using a buffer fluoric acid solution prepared by blending a 40 wt. % ammonium fluoride solution, a 50 wt. % hydrofluoric acid solution, and pure water ($H_2O$) with specified volume ratios.

(2) Photo-Curing Method

Figure 4:
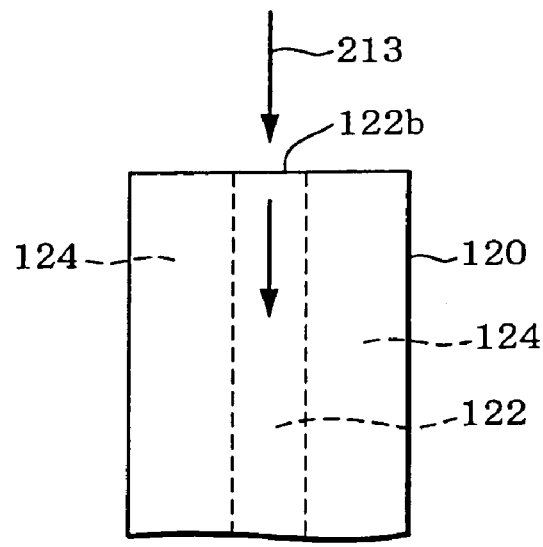
FIG. 4 is a schematic illustrating one example of methods of manufacturing the optical fibers shown in FIG. 1.
Figure 4:
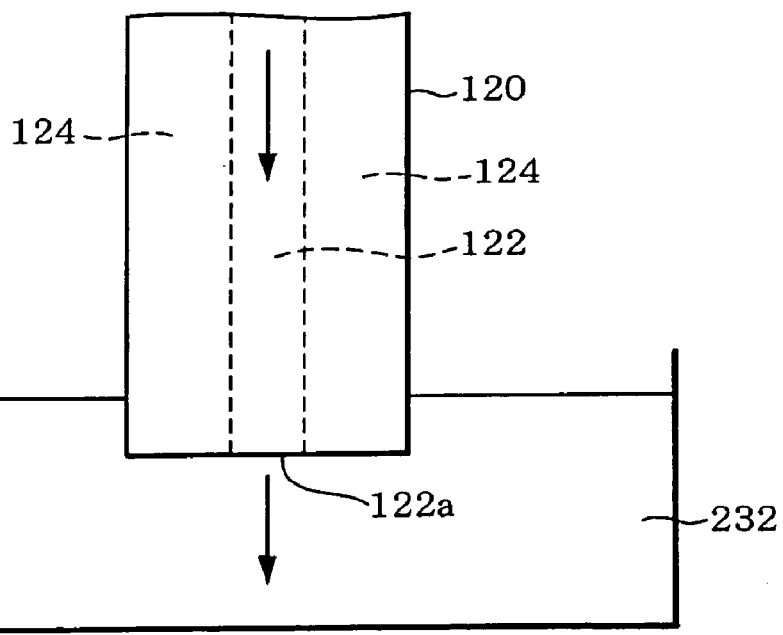

Next, procedures to extend the core 122 by photo-curing are explained (refer to FIG. 4). In this method, a growth of photo-curing resin is positioned at the end surface of the core 122 of the optical fiber 120 to protrude the end surface 122a of the core 122 beyond the end surface 124a of the clad 124. In this case, there is no specific restriction on the material of the optical fiber 120 as far as the adherence with the photo-curing resin is secured.

An end part (one of the two end parts) of the optical fiber 120 including the end surface 122a is soaked into a liquid material 232 including a precursor of ultraviolet curing resin as FIG. 4 shows. At the other end part, ultraviolet rays 213 are let into through an end surface 122b of the core 122. Then, the ultraviolet rays 213 entering through the end surface 122b are transmitted inside the core 122, and are emitted from the end surface 122a of the core 122. In this case, no ultraviolet rays are introduced into the clad 124. No ultraviolet rays therefore are emitted from the clad 124, and the end surface 122a of the core 122 is the only part that emits the ultraviolet rays 213. As a result, by the ultraviolet rays 213 emitted from the end surface 122a of the core 122, the precursor of the ultraviolet curing resin that is included in the liquid material 232 gets reacted at the end surface 122a of the core 122. According to the above operation, a growth of the ultraviolet curing resin is formed at the end surface 122a of the core 122 so that the core 122 is extended. Consequently, the optical fiber 120 is provided with a structure where the end surface 122a of the core 122 protrudes beyond the end surface 124a of the clad 124 as shown in FIGS. 1 and 2.

FIG. 4 is an example where the core 122 is extended while the end part of the optical fiber 120 is soaked into the liquid material 232. Instead of soaking the end part of the optical fiber 120 into the liquid material 232, it is also possible to position the liquid material 232 onto the end surface 122 of the optical fiber 120 and then let ultraviolet rays into through the end surface 122b of the core 122 of the other end part to extend the core 122 in the same manner as FIG. 4 shows. No drawing is shown for this alternative.

Forming of Base Member

Figure 5:
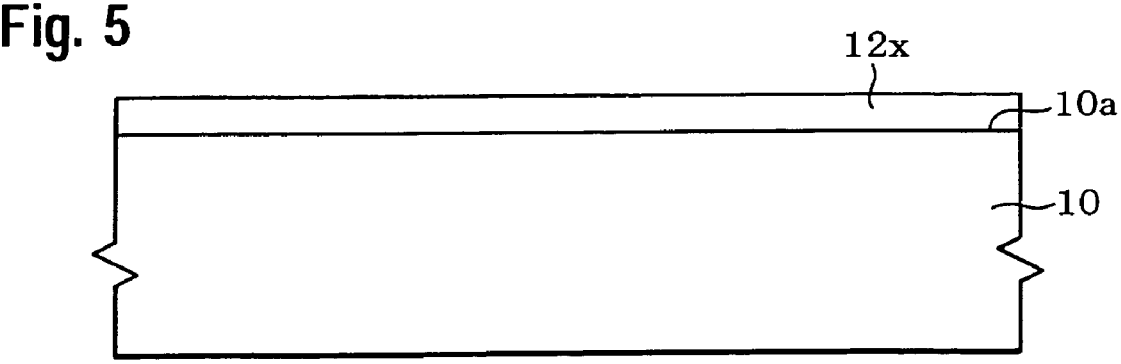
FIG. 5 is a schematic illustrating one process of a connection method to couple optical fibers of one exemplary embodiment of the present invention.
Figure 6:
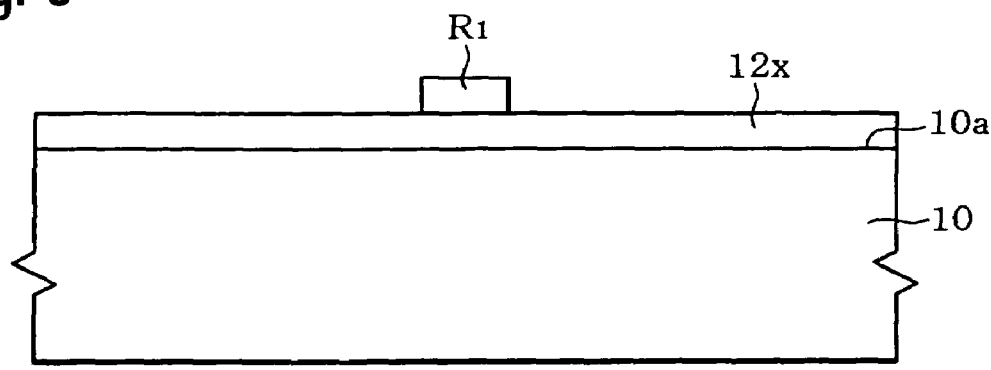
FIG. 6 is a schematic illustrating one process of the connection method to couple optical fibers of one exemplary embodiment of the present invention.
Figure 7:
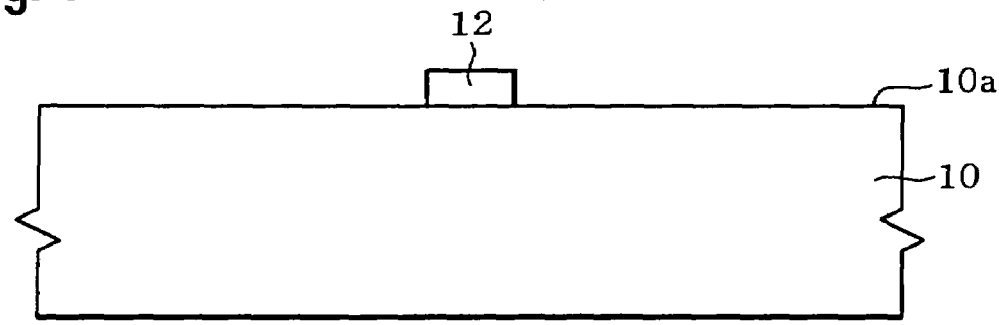
FIG. 7 is a schematic illustrating one process of the connection method to couple optical fibers of one exemplary embodiment of the present invention.

The base member 12 is formed over the substrate 10 (refer to FIGS. 5–7). The plane shape of the base member 12 is conveniently arranged depending on the connection method used to optically couple the optical fibers 120 and 220. As the method of forming the base member 12, an appropriate method (for example, a selective growth method, a dry etching method, a wet etching method, a lift off method, a transfer method, etc.) can be selected depending on the material, shape, and size of the base member 12. In the exemplary embodiment, the case where the base member 12 is composed of polyimide resin will be described.

First, a precursor of polyimide is applied on the substrate 10 made of a glass substrate. Then the substrate 10 is heat-treated at about 150 degrees centigrade. Thus, a resin layer 12x is formed on the top surface 10a of the substrate 10 (refer to FIG. 5). The resin layer 12x is capable of maintaining its shape but is not cured completely at this point.

Next, a resist layer R1 is formed on the resin layer 12x, and thereafter a photolithography process is implemented using a mask of a given pattern (not shown in the drawing). This allows the resist layer R1 of a given pattern to be formed (refer to FIG. 6).

Then, utilizing the resist layer R1 as a mask, the resin layer 12x is patterned by wet etching using alkali solution for example. Thereafter, heat treatment at about 350 degrees centigrade is implemented after the resist layer R1 is removed. This heat treatment completely cures the resin, and thereby the base member 12 is achieved (refer to FIG. 7). In the exemplary embodiment, the case where the plane shape of the base member 12 is circular will be described.

Forming Connecting Part Precurser

Figure 8:
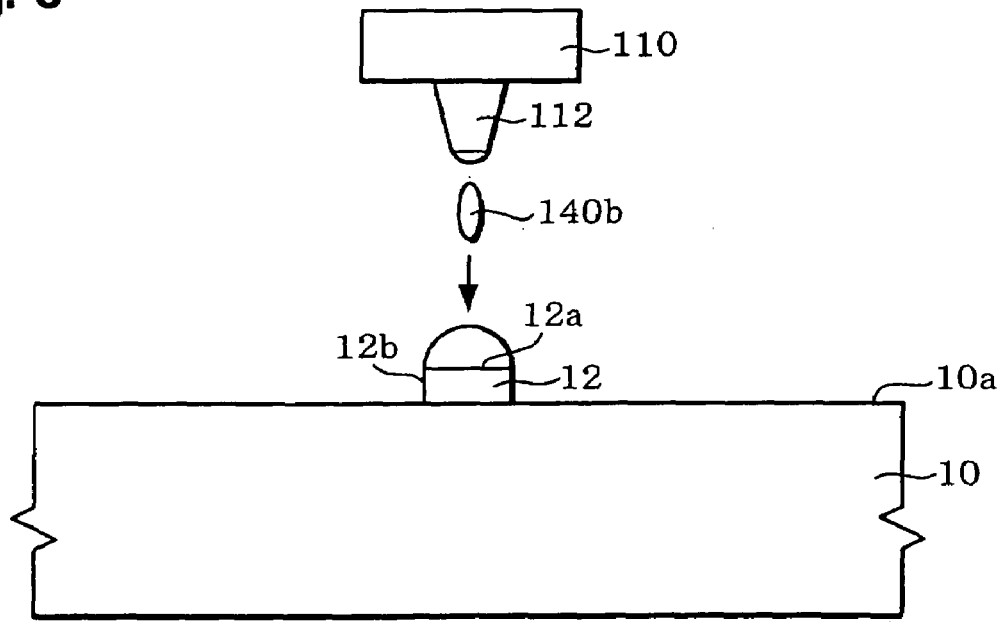
FIG. 8 is a schematic illustrating one process of the connection method to couple optical fibers of one exemplary embodiment of the present invention.
Figure 9:
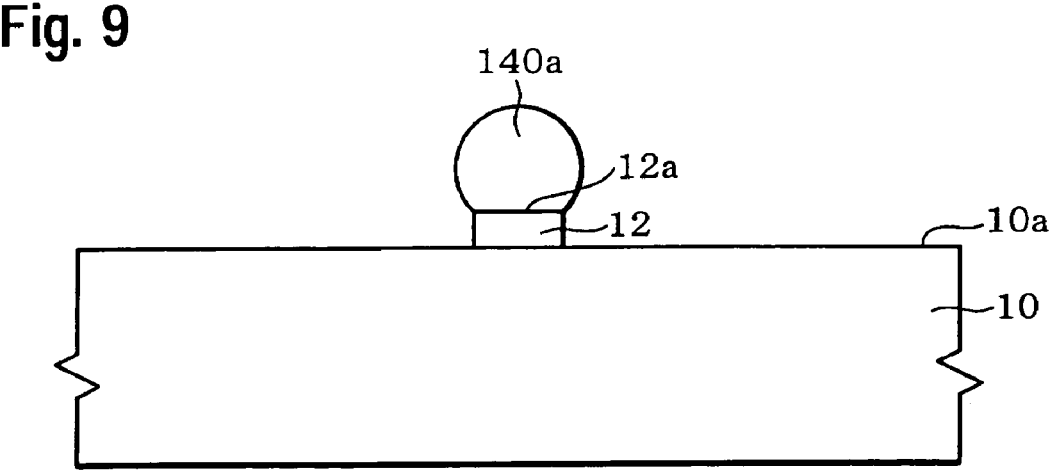
FIG. 9 is a schematic illustrating one process of the connection method to couple fibers of one exemplary embodiment of the present invention.
Figure 10:
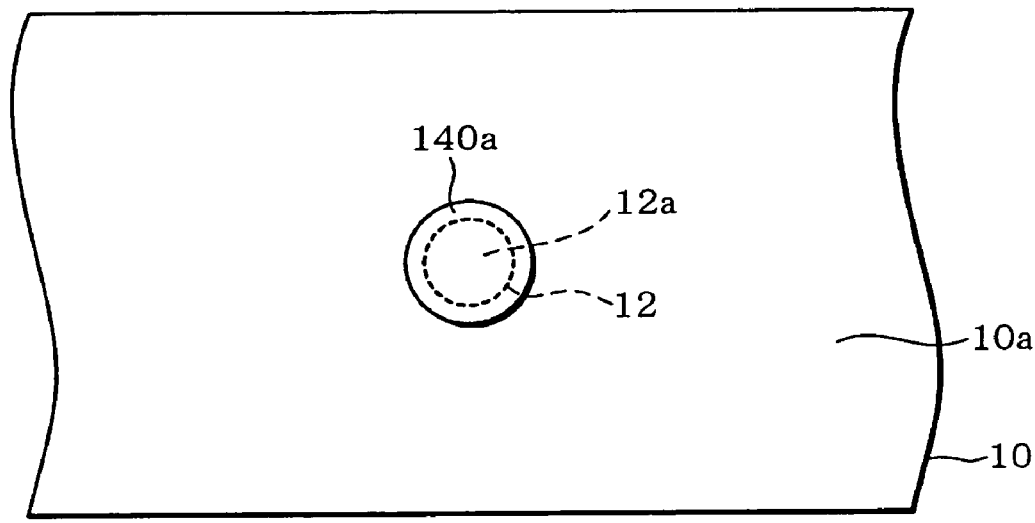
FIG. 10 is a schematic illustrating the process shown in FIG. 9.

A droplet 140b of the liquid material to form the connecting part 140 is ejected onto the top surface 12a of the base member 12 so as to form a connecting part precursor on the top surface 12a of the base member 12 (refer to FIGS. 8–10). As described above, the liquid material has a characteristic of being hardened by applying energy.

As a method of ejecting the droplet 140b, for example, a dispenser method or an ink-jet method is named. The dispenser method is an ordinary way to be used for dispense the droplet 140b. It is effective on a relatively large area.

The ink-jet method is a way of ejecting a droplet by using an ink-jet head. Using this method makes it possible to control a position to which the droplet is ejected at the micrometer level and to control the volume of the droplet to be ejected at the picoliter level. As a result, it becomes possible to manufacture a connecting part of a fine structure on a top surface of a micro base member.

A method of ejecting the droplet 140b by using an ink-jet head 110 will now be described. The droplet 140b of the liquid material is ejected from a nozzle 112 of the ink-jet head 110 onto the top surface 12a of the base member 12, as FIG. 8 shows. As a result, the connecting part precursor 140a is formed on the top surface 12a of the base member 12, as shown in FIGS. 9 and 10. FIG. 10 is a schematic illustrating the process shown in FIG. 9.

As methods of ink-jet ejecting, for example, there are two methods as described below: (i) the size of a bubble in the liquid (in this case, it is the connecting part precursor) is changed by heat to cause pressure, which eventually ejects the liquid; (ii) a piezoelectric element is used to cause pressure, which eventually ejects the liquid. In order to control pressure, method (ii) is more effective.

A related art image recognition technology that is commonly used in an exposure and an inspection work step of semiconductor IC manufacturing processes is applied for alignment between the position of an ink-jet head nozzle and the position to which a droplet is ejected. For example, the position of the nozzle 112 of the ink-jet head 110 is aligned with that of the top surface 12a of the base member 12. After the alignment, the voltage to be applied to the ink-jet head 110 is adjusted and then the droplet 140b is ejected. Here, the droplet 140b is deposited on the top surface 12a of the base member 12 by surface tension. The connecting part precursor 140a of desired shape and size can be formed by adjusting the ejection volume of the droplet 140b.

The droplet 140b is ejected as many times as needed, to form the connection part precursor 140a. The connecting part precursor 140a of desired shape and size can be formed by the number of times that ejects the droplet 140b.

The connecting part precursor 140a is formed in such shape and size that the end surfaces 122a and 222a make contact with the connecting part precursor 140a, in the event that the distance between the end surface 122a of the core 122 of the optical fiber 120, and the end surface 222a of the core 222 of the optical fiber 220 is set to be a predetermined value.

If needed, lyophilic or lyophobic treatment is done for the top surface 12a of the base member 12 before ejecting the droplet 140b. Additionally, if needed, lyophobic treatment is done for the side surface 12b of the base member 12 before ejecting the droplet 140b. This makes it possible to control the wettability of the top surface 12a and the side surface 12b of the base member 12 for the droplet 140b. This operation enables controlling the shape and size of the connecting part 140 more precisely.

Figure 11:
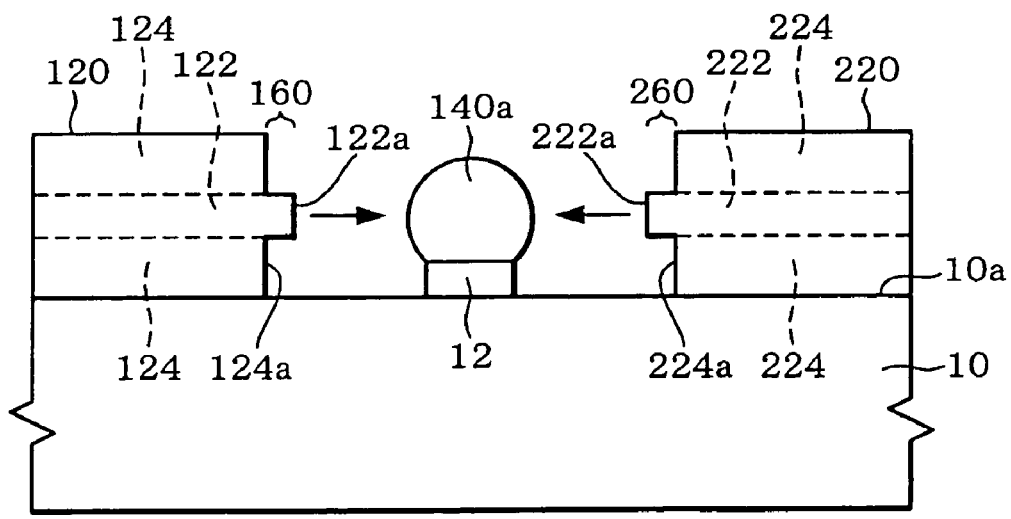
FIG. 11 is a schematic illustrating one process of the connection method to couple optical fibers of one exemplary embodiment of the present invention.
Figure 12:
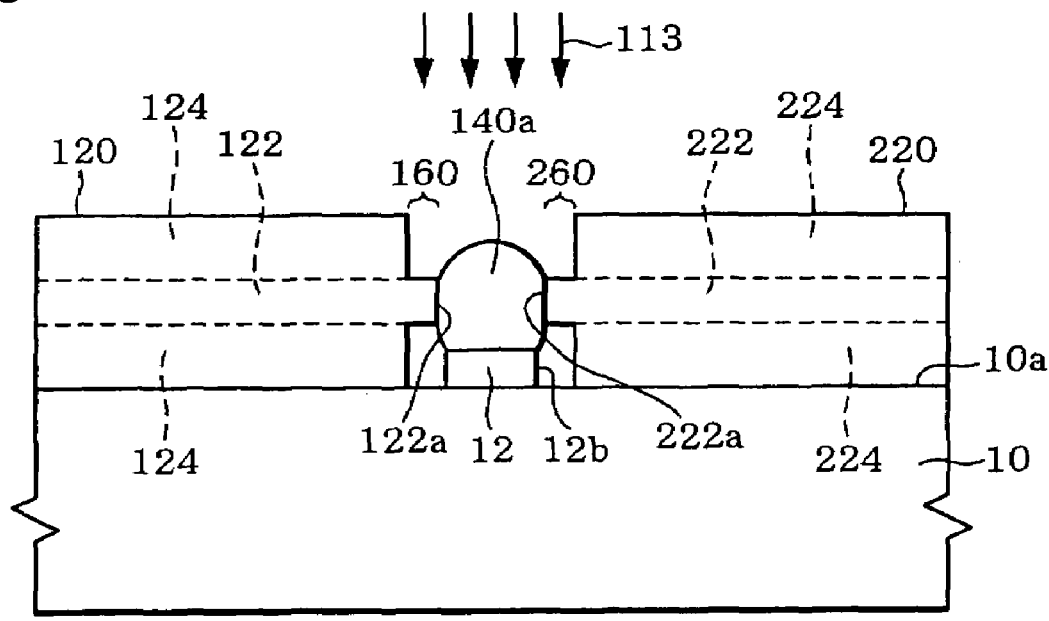
FIG. 12 is a schematic illustrating one process of the connection method to couple optical fibers of one exemplary embodiment of the present invention.

Then, the end surface 122a of the core 122 of the optical fiber 120 is positioned to face the end surface 222a of the core 222 of the optical fiber 220 through the connecting part 140, as FIG. 11 shows. Then, the end surfaces 122a and 222a are brought into contact with the connecting part precursor 140a, as FIG. 12 shows. Specifically, the connecting part precursor 140a achieved by the above operation makes contact with the end surfaces 122a and 222a, as FIG. 12 shows.

In this case, the end surface 122a of the core 122 protrudes beyond the end surface 124a of the clad 124 in the optical fiber 120, as FIG. 12 shows. Similarly, the end surface 222a of the core 222 protrudes beyond the end surface 224a of the clad 224 in the optical fiber 220. Thus, only the end surfaces 122a and 222a of the cores can be easily brought into contact with the connecting part precursor 140a.

The optical fibers 120 and 220 may be disposed on the substrate 10 so that the end surfaces 122a and 222a of the cores face the base member 12 before forming the connecting part precursor 140a. Thereafter the connecting part precursor 140a that makes contact with the end surfaces 122a and 222a of the cores may be formed on the top surface 12a of the base member 12 by ejecting the droplet 140b onto the top surface 12a of the base member 12. Otherwise, the optical fibers 120 and 220 may be provided on the substrate 10 so that the connecting part precursor 140a makes contact with the end surfaces 122a and 222a after the connecting part precursor 140a is formed on the top surface 12a of the base member 12 by ejecting the droplet 140b onto the top surface 12a of the base member 12.

Forming Connecting Part

Next, the connecting part precursor 140a is hardened to form the connecting part 140, as FIG. 12 shows. Some energy 113, such as thermal energy and optical energy, is applied to the connecting part precursor 140a.

To harden the connecting part precursor 140a, an appropriate hardening method is selected depending on the type of the liquid material. Specifically, applying thermal energy, radiating ultraviolet rays, laser beams, etc. can be named as a hardening method. The amount of energy 113 to be applied is adjusted depending on the shape, size and material of the connecting part precursor 140a. Through the manufacturing steps described above, the connection unit 1000, including the optical fibers 120 and 220 that are coupled to each other through the connecting part 140 provided on the top surface 12a of the base member 12, is achieved (refer to FIGS. 1 and 2).

3. Advantageous Effects

A connection structure between optical fibers and a connection method to couple them, of the present exemplary embodiment, have the following advantageous effects.

(1) First, the connecting part 140 is joined to the end surfaces 122a and 222a of the optical fibers 120 and 220. Thus, the precise alignment of the optical fibers 120 and 220 is unnecessary. To explain the reason for this, an ordinary connection structure between optical fibers will be described below.

Generally, when optical fibers are optically coupled to each other, the connecting part is not formed between optical fibers in some cases. In this case, the precise alignment of the optical fibers is required in order to allow light emitted from one optical fiber to enter the other optical fiber. A method where optical fibers are fusion-bonded to each other is known as a general method to couple optical fibers (refer to Description of the Related Art). In this method, optical fibers should be precisely aligned with each other before fusion-bonding.

However, according to a connection structure (the connection unit 1000) of the exemplary embodiment, the connecting part 140 is joined to the end surface 122a of the optical fiber 120 and the end surface 222a of the optical fiber 220. The connecting part 140 is formed by hardening the connecting part precursor 140a while the connecting part precursor 140a makes contact with the end surfaces 122a and 222a. Namely, the alignment of the optical fibers 120 and 220 is sufficiently achieved by only bringing the connecting part precursor 140a into contact with the end surfaces 122a and 222a of the optical fibers 120 and 220. Thus, secure optical communication between the optical fibers 120 and 220 through the connecting part 140 is established without precise alignment of the optical fibers 120 and 220. In addition, the optical fibers 120 and 220 can be optically coupled to each other more easily. Furthermore, as compared to a method where optical fibers are fusion-bonded to each other, which is one of general connection methods for optical fibers, the joined part of optical fibers need not be fused. It therefore is unnecessary that large thermal energy is applied to the joined part of optical fibers. Thus, massive manufacturing processes required to fuse the joined part of optical fibers are unnecessary, leading to reduction of the cost of manufacturing processes.

(2) Second, the connecting part 140 is formed by hardening a liquid material that is hardened by applying energy.

Namely, the connecting part precursor 140*a* is formed on the top surface 12*a* of the base member 12. Then, while making contact with the end surfaces 122*a* and 222*a*, the connecting part precursor 140*a* is hardened. The shape and size of the connecting part precursor 140*a* can be controlled by adjusting the ejection volume of the droplet 140*b*. Here, as long as the side surface 12*b* of the base member 12 (refer to FIG. 8) does not get wet with the connecting part precursor 140*a*, surface tension acts mainly on the connecting part precursor 140*a* mainly.

Specifically, the shape and size of the connecting part precursor 140*a* can be controlled by adjusting the volume of the droplet used to form the connecting part precursor 140*a*. As a result, the shape and size of the connecting part precursor 140*a* can be adjusted depending on the distance between the optical fibers 120 and 220.

(3) Third, the connecting part precursor 140*a* is formed on the top surface 12*a* of the base member 12. Generally, an end surface of a core of an optical fiber is minute in size. In the exemplary embodiment, the connecting part precursor 140*a* can be formed on the top surface 12*a* of the base member 12 that is minute by ejecting a droplet onto the top surface 12*a* of the base member 12 with an ink-jet method.

Here, in the exemplary embodiment, even in the case where the connecting part precursor 140*a* is hardened to form the connecting part 140 while usual optical fibers, instead of the optical fibers 120 and 220, are brought into contact with the connecting part precursor 140*a* provided on the top surface 12*a* of the base member 12, the same advantageous effects as the above (1) through (3) are achieved. "Usual optical fibers" refers to optical fibers where the height of an end surface of a core is almost equal to the height of an end surface of a clad at an end part.

(4) Fourth, since the end surface 122*a* of the core 122 of the optical fiber 120 and the end surface 222*a* of the core 222 of the optical fiber 220 are coupled through the connecting part 140, the optical loss of the light transmitted between the optical fibers 120 and 220 can be reduced.

Generally, in optical fibers, a part where light is transmitted practically is a core. According to the connection structure of the exemplary embodiment, therefore, the connecting part 140 is joined to only the end surfaces 122*a* and 222*a* of the cores 122 and 222. Thereby light is efficiently transmitted between the cores 122 and 222 of the optical fibers 120 and 220 through the connecting part 140.

In addition, a connector needs not to be used in the connection structure of the exemplary embodiment, as compared to a method where optical fibers are coupled to each other through a connector (refer to Description of the Related Art), which is one of general connection methods for optical fibers. The simplification and miniaturization of the joined part of optical fibers therefore are achieved. Thus, the connection structure of the exemplary embodiment can be incorporated into a micro device (for example, an optical module).

4. Modifications

Modifications of the connection structure between optical fibers of the exemplary embodiment will now be described. The following modifications 1 through 5 have the same advantageous effects as those in the connection unit 1000 of the exemplary embodiment. Furthermore, each of the modifications can be applied to not only the connection unit 1000 of the exemplary embodiment (refer to FIGS. 1 and 2) but also the connection structure of any other modification. In each of the modifications, for the same components as those of the connection unit 1000 of the exemplary embodiment, the same reference numerals are used and detailed description is omitted.

In the following modifications, connecting parts 240, 340, 440, and 540 can be formed of the same material and in the same way as those of the connecting part 140 of the exemplary embodiment. In addition, base members 22 and 42 can be formed of the same material and in the same way as those of the base member 12 of the exemplary embodiment.

(1) Modification 1

Figure 13:
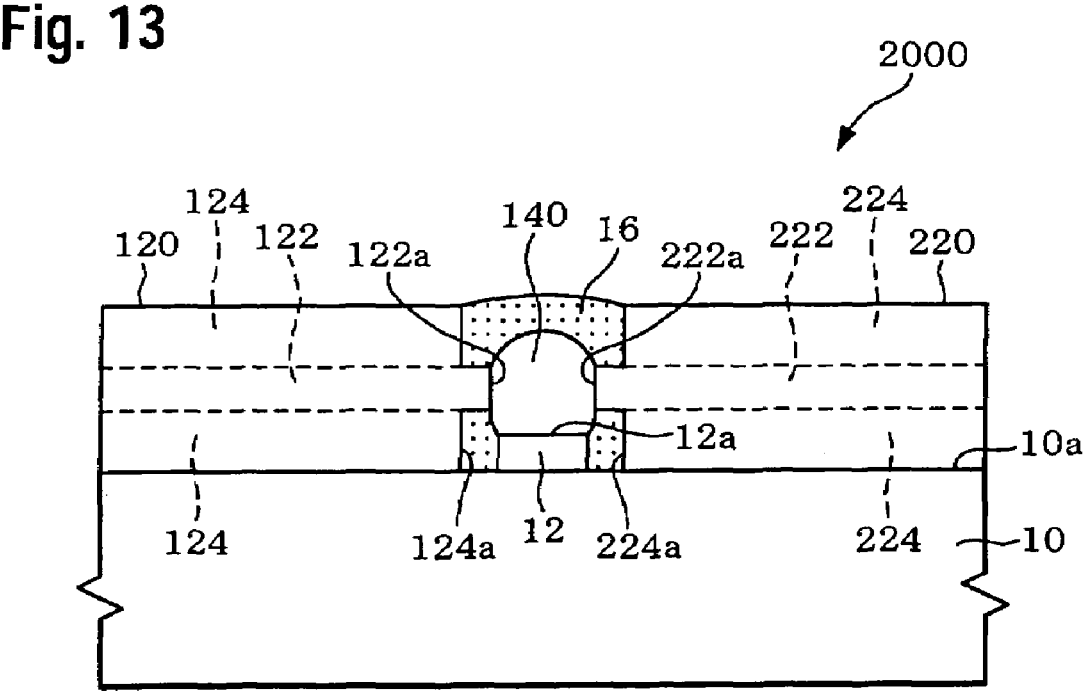
FIG. 13 is a schematic illustrating one modification of the connection structure between optical fibers of one exemplary embodiment of the present invention.
Figure 14:
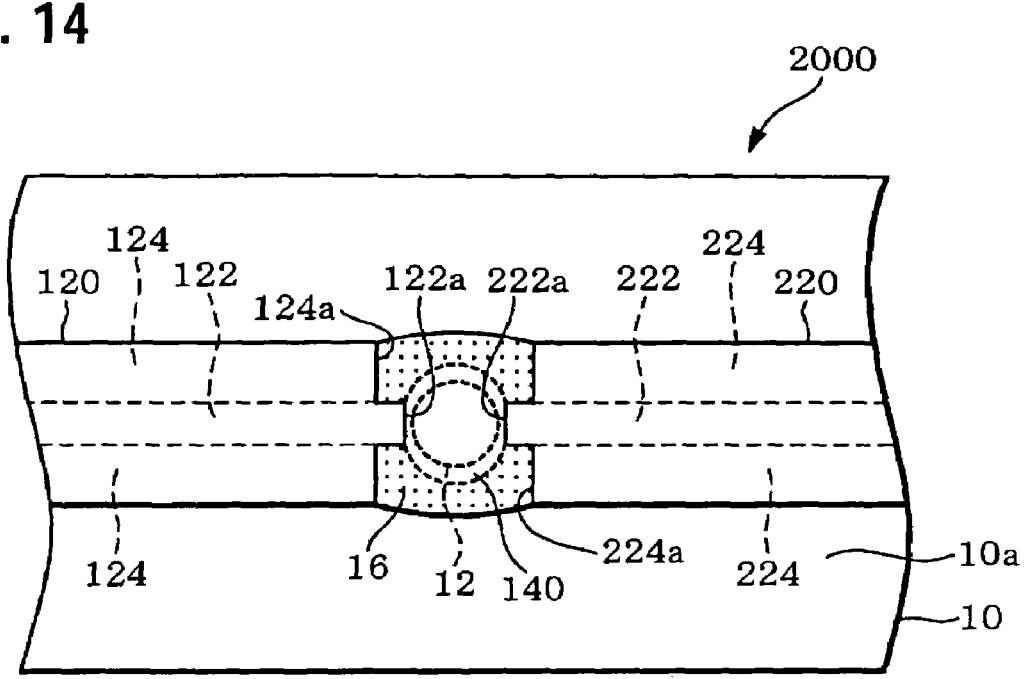
FIG. 14 is a schematic illustrating the connection structure between optical fibers shown in FIG. 13.

FIG. 13 is a schematic showing a connection structure between optical fibers (a connection unit 2000), which is one modification of the exemplary embodiment. FIG. 14 is a plan view schematically illustrating the connection unit 2000 shown in FIG. 13.

The connection unit 2000 is a feature achieved by burying protruding portions (convex portions 160 and 260) of the cores 122 and 222, and the surrounds of the connecting part 140 and the base member 12, of the connection unit 1000 of the exemplary embodiment (refer to FIGS. 1 and 2), in sealant 16. Namely, the structure of the connection unit 2000 other than the sealant 16 is the same as that of the connection unit 1000 of the exemplary embodiment.

In the connection unit 2000, the surrounds of the base member 12 and the connecting part 140 is covered by the sealant 16, enabling the connecting part 140 to be certainly fixed on the top surface 12*a* of the base member 12, and between the end surfaces 122*a* and 222*a*. As a result, yield can be enhanced. The sealant used in connection units of another modifications to be described later also achieve this advantageous effect.

It is desirable that the refractive index of the sealant 16 is smaller than those of the cores 122 and 222 of the optical fibers 120 and 220, and that of the connecting part 140. This condition enables the sealant 16 to achieve a function as a clad that confines light transmitting between the cores 122 and 222 through the connecting part 140, at the end parts of the optical fibers 120 and 220.

Furthermore, it is desirable that the refractive index of the connecting part 140 is equal to those of the cores 122 and 222 of the optical fibers 120 and 220, and more desirable that the refractive index of the sealant 16 is equal to those of the clads 124 and 224 of the optical fibers 120 and 220. Specifically, in this case, the connecting part 140 and the sealant 16 achieve the same functions as those of a core and clad, respectively. Thus, optical loss can be reduced.

As the material of the sealant 16, although there is no specific restriction, resin materials, such as ultraviolet curing resin and thermosetting resin, are available. In the following modifications, sealant 26, 36, 46, and 56 can be formed of the same material and in the same way as those of the sealant 16 of the connection unit 2000 of the modification 1.

(2) Modification 2

Figure 15:
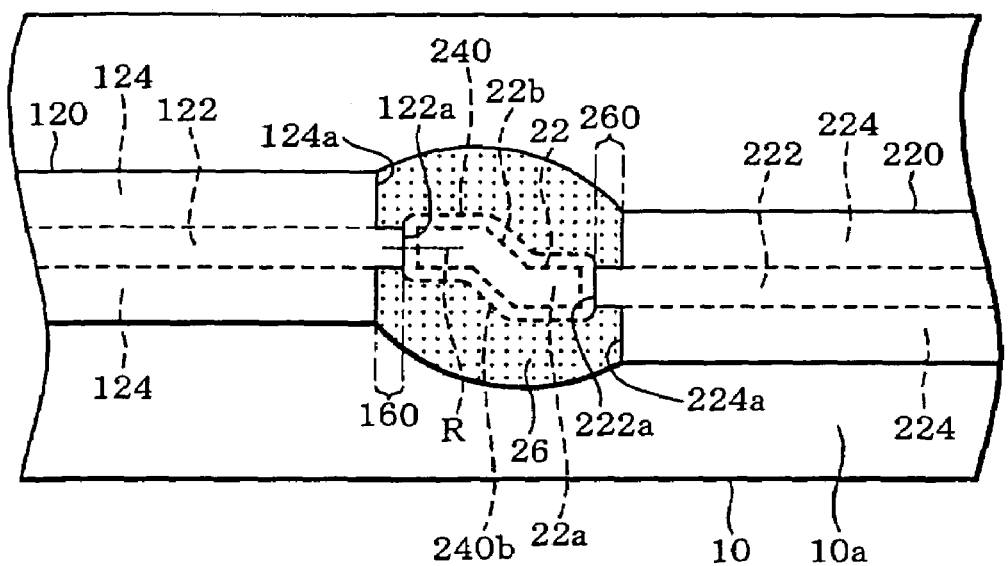
FIG. 15 is a schematic illustrating one modification of the connection structure between optical fibers of one exemplary embodiment of the present invention.

FIG. 15 is a schematic showing a connection structure between optical fibers (a connection unit 3000), which is one modification of the exemplary embodiment.

In the connection unit 3000, the shape of the base member 22 is different from that of the base member 12 of the connection unit 1000 of the exemplary embodiment (refer to FIGS. 1 and 2). Specifically, a top surface 22*a* of the base member 22 includes a curved part 22*b*.

The connecting part 240 is formed by using the same method as that of forming the connecting part 140 of the connection unit 1000 of the exemplary embodiment. Specifically, the connecting part 240 is formed by ejecting a droplet onto the top surface 22*a* of the base member 22 and hardening it. The connecting part 240 therefore also includes a curved part 240b as with the top surface 22a of the base member 22.

In the connection unit 3000, as with the connection unit 2000 of the modification 1, protruding portions (the convex portions 160 and 260) of the cores 122 and 222, and the surrounds of the connecting part 240 and the base member 22 are buried in the sealant 26.

In the connection unit 3000, the top surface 22a of the base member 22 includes the curved part 22b, and the connecting part 240 includes the curved part 240b. In the connection unit 3000, therefore, the center of the end surface 222a of the core 222 of the optical fiber 220 is not positioned on a line R that comes through the center of the end surface 122a of the core 122 of the optical fiber 120 and is perpendicular to the end surface 122a as FIG. 15 shows. The end surfaces 122a and 222a are coupled to each other through the connecting part 240, however, enabling secure transmission of light between the optical fibers 120 and 220 through the connecting part 240.

The connection unit 3000 can be formed by the same method as that of forming the connection unit 1000 of the exemplary embodiment (refer to FIGS. 1 and 2). Specifically, a connecting part precursor (not shown in the drawing) is formed on the top surface 22a of the base member 22 first, and thereafter the end surface 122a of the core 122 of the optical fiber 120 and the end surface 222a of the core 222 of the optical fiber 220 are brought into contact with the connecting part precursor. With this state, energy (not shown in the drawing) is applied so as to harden the connecting part precursor, enabling the connection unit 3000 to be formed.

(3) Modification 3

Figure 16:
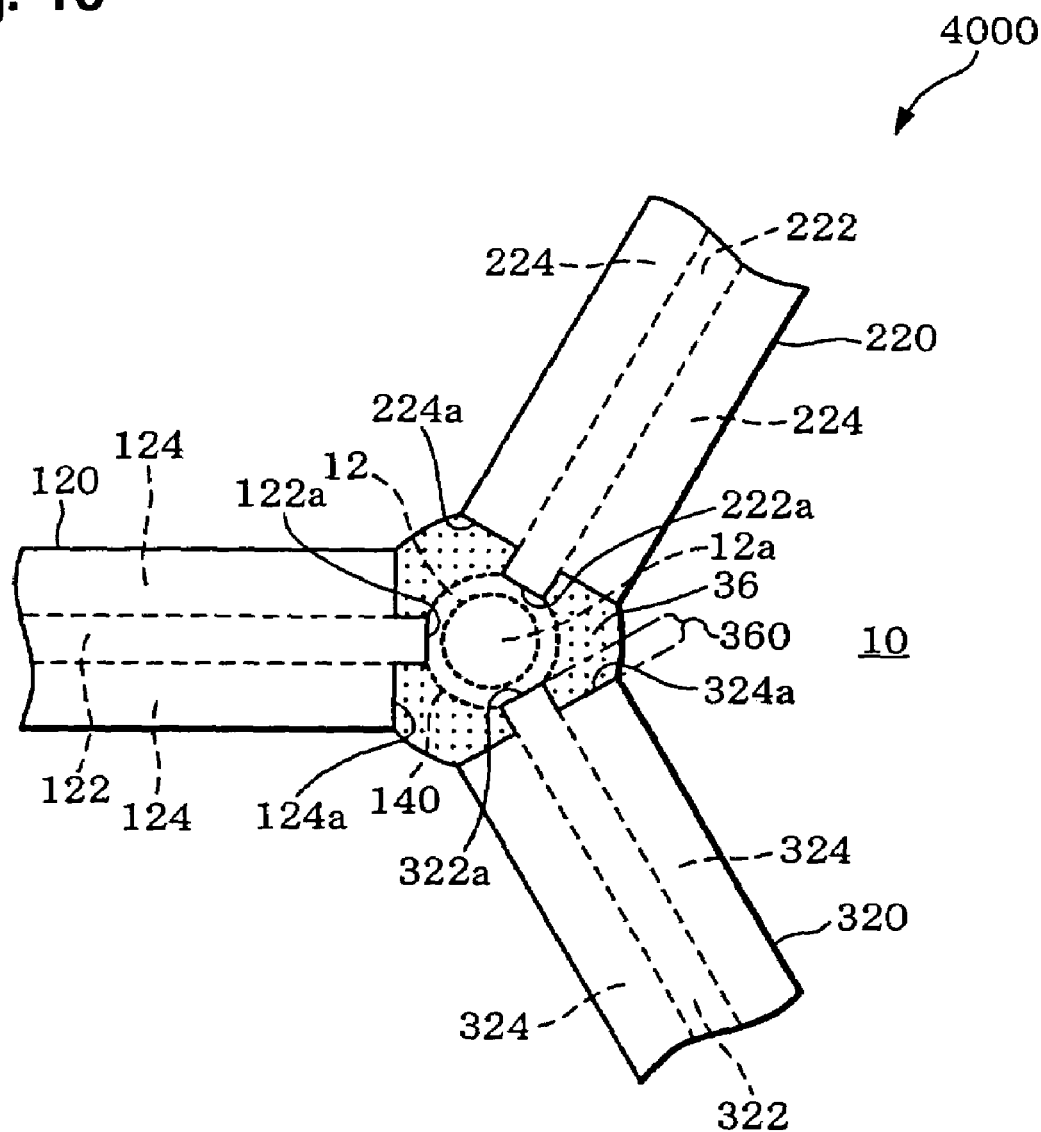
FIG. 16 is a schematic illustrating one modification of the connection structure between optical fibers of one exemplary embodiment of the present invention.

FIG. 16 is a schematic showing a connection structure between optical fibers (a connection unit 4000), which is one modification of the exemplary embodiment.

The structure of the connection unit 4000 shown in FIG. 16 is different from that of the connection unit 1000 of the exemplary embodiment (refer to FIGS. 1 and 2) in that three optical fibers 120, 220 and 320 are optically coupled to each other through the connecting part 140.

The exemplary embodiment shows the case where a core 322 is not covered by a clad 324 at the end part in the optical fiber 320. Specifically, the end surface 322a of the core 322 protrudes beyond the end surface 324a of the clad 324 at the end part of the optical fiber 320. Accordingly, the core 322 and the clad 324 form a convex portion 360.

In the connection unit 4000, as with the connection unit 2000 of the modification 1, protruding portions (the convex portions 160, 260, and 360) of the cores 122, 222, and 322, and the surrounds of the connecting part 140 and the base member 12 are buried in the sealant 36.

Specifically, in the connection unit 4000, the end surface 122a of the core 122 of the optical fiber 120, the end surface 222a of the core 222 of the optical fiber 220, and the end surface 322a of the core 322 of the optical fiber 320 are coupled to each other through the connecting part 140. The optical fiber 320 can be formed of the same material as that of the optical fibers 120 and 220 shown in the exemplary embodiment.

In the connection unit 4000, the base member 12 and the optical fibers 120, 220, and 320 are provided on the substrate 10 as with the connection unit 3000 of the modification 2.

In this exemplary embodiment, although shown was the case where a height of the end surface of the core is different from that of the clad in all of three optical fibers 120, 220, and 320, a height of the end surface of the core may be the same as that of the clad in at least one of the optical fibers 120, 220, 320.

The connection unit 4000 can be formed by the following method. The connecting part precursor (not shown in the drawing) is formed on the top surface 12a of the base member 12 first, and thereafter the end surface 122a of the core 122 of the optical fiber 120, the end surface 222a of the core 222 of the optical fiber 220, and the end surface 322a of the core 322 of the optical fiber 320 are brought into contact with the connecting part precursor. With this state, energy (not shown in the drawing) is applied so as to harden the connecting part precursor, enabling the connection unit 4000 to be formed.

(4) Modification 4

Figure 17:
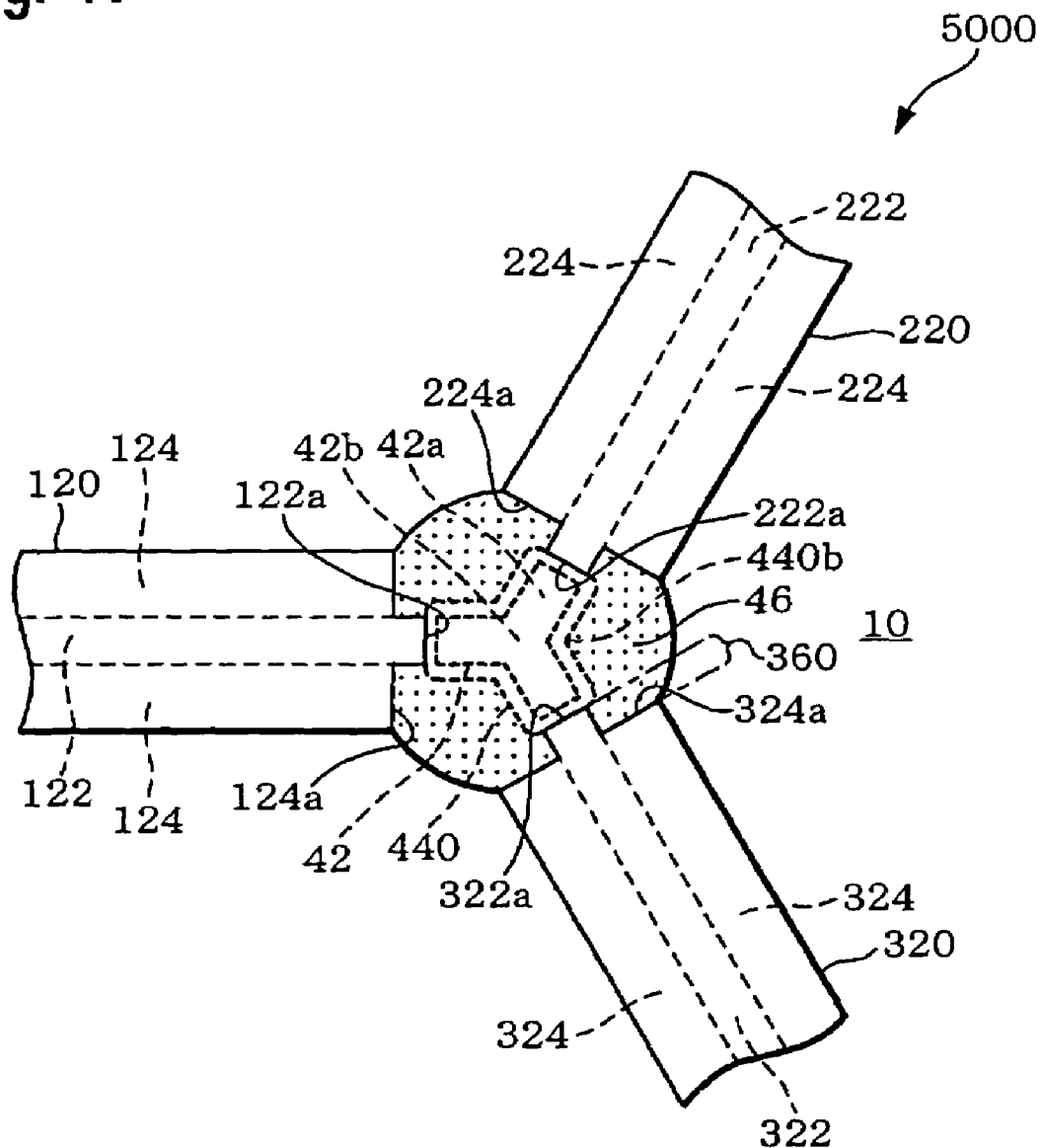
FIG. 17 is a schematic illustrating one modification of the connection structure between optical fibers of one exemplary embodiment of the present invention.

FIG. 17 is a schematic showing a connection structure between optical fibers (a connection unit 5000), which is one modification of the exemplary embodiment.

The connection unit 5000 shown in FIG. 17 has the same structure as that of the connection unit 4000 of the modification 3 in that three optical fibers 120, 220 and 320 are optically coupled to each other through a connecting part. The shape of the base member 42 of the connection unit 5000 is different from that of the base member 12 of the connection unit 4000 of the modification 2.

Specifically, a top surface 42a of the base member 42 includes a branch part 42b. The connecting part 440 is formed by using the same method as that of forming the connecting part 140 of the connection unit 1000 of the exemplary embodiment. Specifically, the connecting part 440 is formed by ejecting a droplet onto the top surface 42a of the base member 42 and hardening it. The connecting part 440 therefore includes a branch part 440b as with the top surface 42a of the base member 42.

In the connection unit 5000, the base member 42 and the optical fibers 120, 220, and 320 are provided on the substrate 10 as with the connection unit 3000 of the modification 3.

The connection unit 5000 can be formed by using the same method as that of forming the connection unit 4000 of the modification 3.

(5) Modification 5

Figure 18:
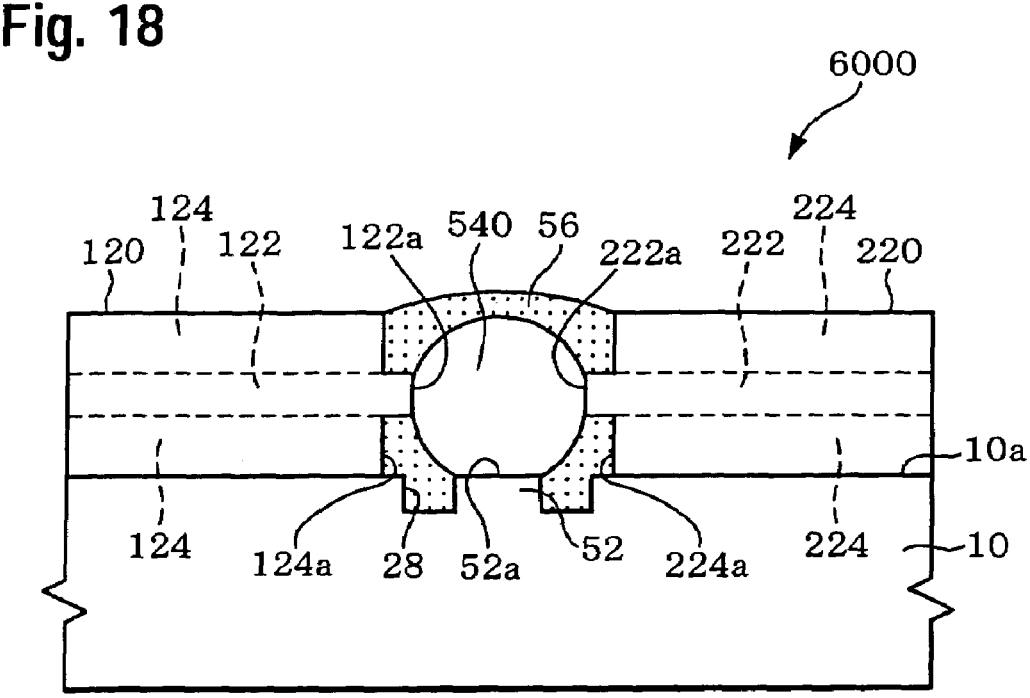
FIG. 18 is a schematic illustrating one modification of the connection structure between optical fibers of one exemplary embodiment of the present invention.
Figure 19:
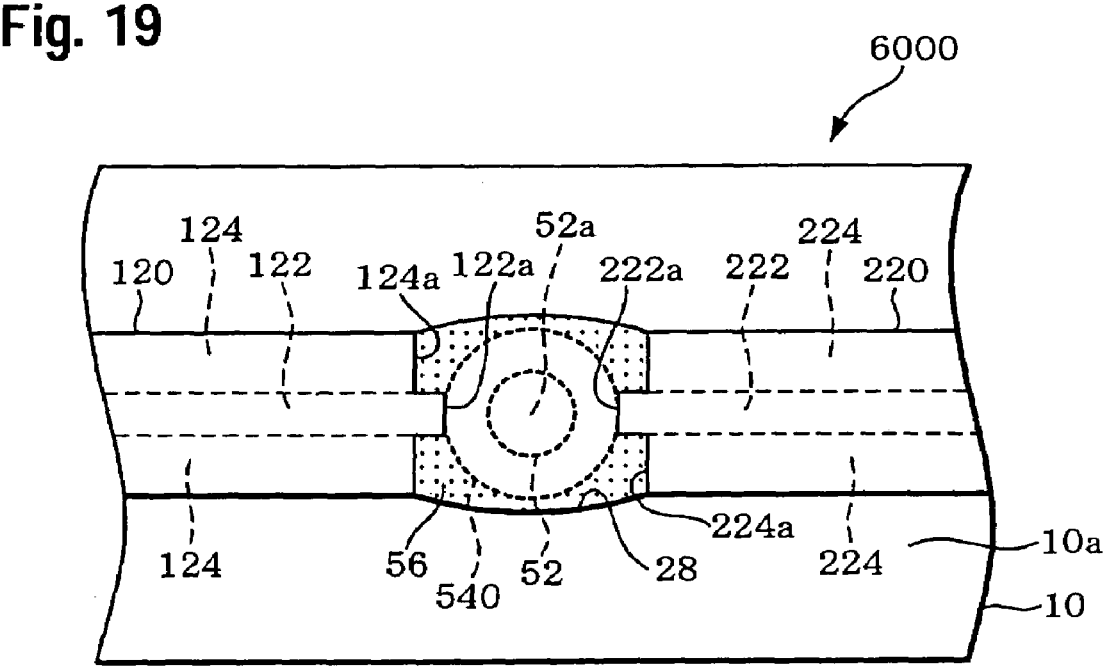
FIG. 19 is a schematic illustrating the connection structure between optical fibers as one modification shown in FIG. 18.

FIG. 18 is a schematic showing a connection structure between optical fibers (a connection unit 6000), which is one modification of the exemplary embodiment. FIG. 19 is a schematic illustrating the connection unit 6000 shown in FIG. 18.

The connection unit 6000 has the same structure as that of the connection unit 2000 of the modification 1 in that protruding portions (the convex portions 160 and 260) of the cores 122 and 222, and the surrounds of the connecting part 540 and a base member 52 are buried in the sealant 56.

The base member 52 is formed monolithically with the substrate 10 in the connection unit 6000. In this case, the base member 52 is formed by patterning the substrate 10 with a method depending on the material of the substrate 10, although there is no specific restriction on the material of the substrate 10. For example, if the substrate 10 is made of a glass substrate, the base member 52 can be formed by using, for example, wet etching with hydrofluoric acid, etching with ion beam, microfabrication with laser, a sand blast method, etc. so as to provide a given patterning for the substrate 10.

Furthermore, in the connection unit 6000, a concave part 28 is formed around the base member 52. A top surface 52a of the base member 52 is almost the same height as the top surface 10a of the substrate 10. The concave part 28 is formed at the same time when the base member 52 is formed by patterning. The sealant 56 can be filled into the concave part 28 in the connection unit 6000. Specifically, the concave part 28 is provided on the substrate 10. Thereby the sealant 56 can be filled into the concave part 28. Thus, the sealant 56 can be disposed around the connecting part 540 by a simplified method.

The present invention is not limited to the above-described exemplary embodiments but may be applied to various kinds of modifications. For example, an aspect of the invention includes substantially the same structure as that described in the exemplary embodiment. For example, a structure where a function, a method, and a result are the same, or a structure where an aim and a result are the same. In addition, an aspect of the invention may include a structure obtained by replacing nonessential parts of the structure described in the exemplary embodiment. An aspect of the invention includes a structure that can achieve the same advantageous effects as those of the structure described in the exemplary embodiment, or a structure that can achieve the same purpose as that thereof. In addition, the invention includes a structure obtained by adding the related art to the structure described in the exemplary embodiment.

What is claimed is:

1. A connection structure between optical fibers, comprising:
    a substrate
    a plurality of optical fibers each having end surfaces;
    a base member provided over the substrate; and
    a connecting part provided on a top surface of the base member and joined to each end surface of the plurality of optical fibers,
    only an end surface of a core being joined to the connecting part in at least one of the plurality of optical fibers.

2. The connection structure between optical fibers according to claim 1, the plurality of optical fibers provided over the substrate.

3. The connection structure between optical fibers according to claim 1, the top surface of the base member being a flat surface.

4. The connection structure between optical fibers according to claim 1, the base member being formed monolithically with the substrate.

5. The connection structure between optical fibers according to claim 1, in the at least one of the plurality of optical fibers where only the end surface of the core is joined to the connecting part, a height of the end surface of the core being different from a height of an end surface of a clad at an end part that is closer to the connecting part, of two end parts.

6. The connection structure between optical fibers according to claim 1, an end surface of the core protruding beyond an end of the clad.

7. The connection structure between optical fibers according to claim 1, the core and the clad forming a portion defining a convex portion at the end part.

8. The connection structure between optical fibers according to claim 1, a refractive index of the connecting part being larger than a refractive index of the clad of the plurality of optical fibers.

9. The connection structure between optical fibers according to claim 1, the refractive index of the connecting part being almost equal to a refractive index of the core of the plurality of optical fibers.

10. The connection structure between optical fibers according to claim 1, the connecting part being formed by hardening a liquid material that is hardened by applying energy.

11. The connection structure between optical fibers according to claim 10, the connecting part being formed of ultraviolet curing resin.

12. The connection structure between optical fibers according to claim 1, the cylindrical base member having a diameter smaller than the diameter of the connecting part.

13. The connection structure between optical fibers according to claim 1, the connecting part contacting the entire upper surface of the cylindrical base member.

14. The connection structure between the optical fibers according to claim 1, the top surface of the base member being a curved surface.

15. The connection structure between the optical fibers according to claim 1, the top surface of the base member making an acute angle with a surface that intersects the top surface at a side part of the base member.

16. The connection structure between the optical fibers according to claim 1, an upper part of the base member being formed in a reverse-taper manner.

* * * * *

UNITED STATES PATENT AND TRADEMARK OFFICE
CERTIFICATE OF CORRECTION

PATENT NO. : 7,215,849 B2  
APPLICATION NO. : 10/814136  
DATED : May 8, 2007  
INVENTOR(S) : Tsuyoshi Kaneko It is certified that error appears in the above-identified patent and that said Letters Patent is hereby corrected as shown below:

On the Title Page  
Item 54 (Title): change  
"CONNECTION STRUCTURE BETWEEN OPTICAL FIBERS ON A SUBSTRATE AND CONNECTION METHOD FOR COUPLING THE SAME" to  
-- CONNECTION STRUCTURE BETWEEN OPTICAL FIBERS AND CONNECTION METHOD FOR COUPLING THE SAME--.

Signed and Sealed this

Ninth Day of October, 2007

JON W. DUDAS  
*Director of the United States Patent and Trademark Office*